(12) United States Patent
O'Neill et al.

(10) Patent No.: US 6,218,618 B1
(45) Date of Patent: Apr. 17, 2001

(54) FORCED ENCAPSULATION CABLE SPLICE ENCLOSURE INCLUDING A CONTAINER FOR EXITING ENCAPSULANT

(75) Inventors: Andrew J. O'Neill, Cordova; Kenneth R. Dumont, Collierville, both of TN (US)

(73) Assignee: Thomas & Betts International, Inc., Sparks, NV (US)

( * ) Notice: Subject to any disclaimer, the term of this patent is extended or adjusted under 35 U.S.C. 154(b) by 927 days.

(21) Appl. No.: 08/742,519

(22) Filed: Nov. 1, 1996

Related U.S. Application Data (63) Continuation of application No. 08/373,356, filed on Jan. 17, 1995, now abandoned.

(51) Int. Cl.$^7$ .................................................. H02G 15/08
(52) U.S. Cl. ................................................ 174/76; 174/93
(58) Field of Search .......................... 174/92, 93, 76, 174/91, 88 R (56) References Cited

U.S. PATENT DOCUMENTS

| | | | |
|---|---|---|---|
| 1,688,693 | * 10/1928 | Eby | 174/92 |
| 2,862,042 | * 11/1958 | Bollmeier | 174/93 |
| 3,138,657 | 6/1964 | Wengen | 174/92 |
| 3,823,250 | 7/1974 | De Monsy et al. | 174/23 |
| 3,992,569 | 11/1976 | Hankins et al. | 174/92 |
| 4,025,717 | 5/1977 | Whittingham | 174/88 |
| 4,648,919 | 3/1987 | Diaz et al. | 156/48 |
| 4,708,938 | * 11/1987 | Hickinbotham | 435/311 X |
| 4,740,653 | 4/1988 | Hellbusch | 174/21 |
| 4,875,952 | 10/1989 | Mullin et al. | 156/48 |
| 4,933,512 | 6/1990 | Nimiya et al. | 174/92 |
| 5,171,813 | * 12/1992 | Patel et al. | 526/328 X |
| 5,251,373 | 10/1993 | DeCarlo et al. | 29/870 |
| 5,382,756 | * 1/1995 | Dagan | 174/92 |

FOREIGN PATENT DOCUMENTS

| | | | |
|---|---|---|---|
| 3905371 | * 8/1990 | (DE) . | |
| 538009 | * 4/1993 | (EP) . | |
| 2176696 | * 11/1973 | (FR) . | |
| 0429611 | * 6/1935 | (GB) . | |
| WO 86/00178 | * 1/1986 | (WO) . | |

* cited by examiner

Primary Examiner—Kristine Kincaid
Assistant Examiner—Chau N. Nguyen
(74) Attorney, Agent, or Firm—Hoffmann & Baron, LLP

(57) ABSTRACT

A method and apparatus is provided for encapsulating a cable splice. An enclosure shell is positioned about the cable splice. The shell includes an inlet port and an outlet port. A curable encapsulant is inserted into the shell through the inlet port. An outlet container is positioned over the outlet port to contain exiting encapsulant. The container is formed of light transmissive material so that the exiting encapsulant may be observed thereby providing a visual indication that the splice is fully encapsulated.

7 Claims, 10 Drawing Sheets

FORCED ENCAPSULATION CABLE SPLICE ENCLOSURE INCLUDING A CONTAINER FOR EXITING ENCAPSULANT

This application is a continuation of application Ser. No. 08/373,356 filed on Jan. 17, 1995 now abandoned.

BACKGROUND OF THE INVENTION

The present invention relates generally to an encapsulated cable splice enclosure. More particularly, the present invention relates to a method and apparatus for viewably containing encapsulant forced into a cable splice enclosure during the encapsulation thereof.

FIELD OF THE INVENTION

Electrical cables, especially telecommunications cables are typically run outdoors, either suspended overhead or buried underground. In order to effect repairs to the individual conductors within the cable, or to make interconnections thereto, the integrity of the cable must be violated. Once repairs or interconnections are accomplished, the exposed area of the cable, commonly referred to as a cable splice, must be resealed in order to protect the conductors against the outdoor environment.

Many techniques are currently known for sealably covering cable splices. One particularly effective technique is to use a cable splice closure, which includes an enclosure filled with an encapsulant which fully surrounds the splice to seal the splice against moisture penetration which is prevalent in outdoor environments. These encapsulants are typically provided in a fluid state and poured into the enclosure over the cable splice. The encapsulant may be forced into the enclosure under pressure so that the encapsulant fully surrounds the cable splice and fills the interstices between conductors. The encapsulant then cures to a gel-like consistency to effectively seal the splice.

In order to assure that the enclosure is filled with encapsulant and all air is forced from the splice, the enclosure typically includes a pressure relief valve. Encapsulant is forced into the enclosure until all air is released through the valve and encapsulant begins to flow out from the valve. The exiting encapsulant provides a vivid indication that air has been purged from the enclosure and that the splice enclosed therein is fully encapsulated.

However, as may be appreciated, the exiting encapsulant has a tendency to flow over the enclosure. Until the encapsulant cures, it is messy and difficult to handle. While it is advantageous to allow the encapsulant to escape so as to provide a visual indication that the enclosure is filled, it makes splice installation more difficult and time consuming.

It is therefore desirable to provide a splice enclosure which provides a visual indicator that the enclosure is filled with encapsulant and which may be easily cleared and handled.

SUMMARY OF THE INVENTION

It is an object of the present invention to provide a method and apparatus for sealably encapsulating a cable splice enclosure.

It is a further object of the present invention to provide a cable splice closure which provides a visual indication that the splice enclosure has been completely filled with curable encapsulant.

It is still a further object of the present invention to provide a cable splice enclosure shell which accommodates exiting encapsulant and provides a visual indication that the enclosure is filled with encapsulant.

In the efficient attainment of these and other objects, the present invention provides an improved method and apparatus for encapsulating a cable splice enclosure. An enclosure shell encloses an electrical cable splice and accommodates a curable encapsulant. The shell includes an inlet port and an outlet port. The outlet port permits exiting of encapsulant therefrom indicating that the shell is filled with encapsulant. An outlet container is positioned over the outlet port to contain the exiting encapsulant. The container is formed of clear material to permit the exiting encapsulant to be observed.

As more particularly described by way of the preferred embodiment herein, the container is formed of an elongate, hollow tube. The tube is positioned over the outlet port. The tube may be formed of translucent or transparent material.

DETAILED DESCRIPTION OF THE PREFERRED EMBODIMENTS

Figure 1:
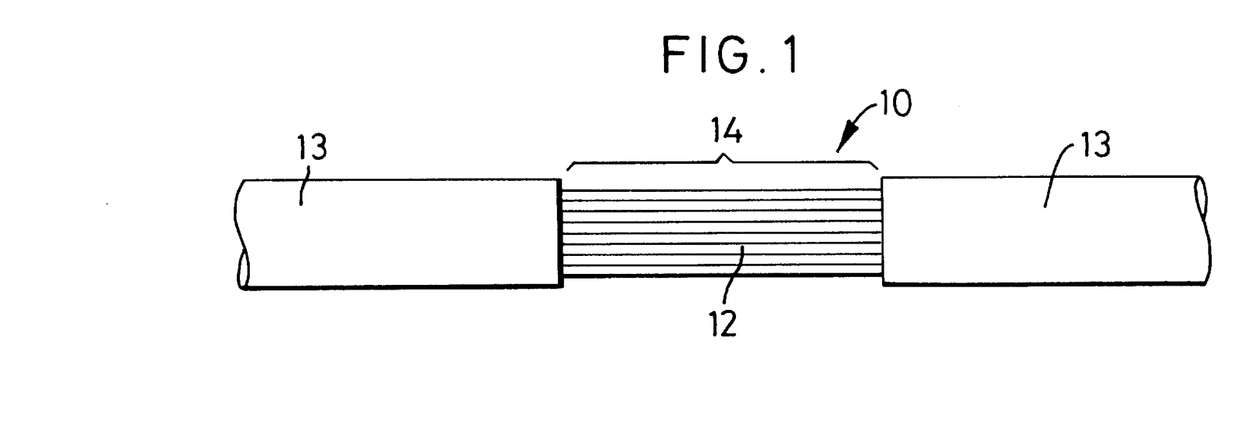
FIG. 1 is a side elevational view of a portion of a typical telecommunications electrical cable having an exposed central area referred to as a cable splice.

Referring to FIG. 1, an extent of the telecommunications cable 10 is shown. Cable 10 includes a plurality of individually insulated electrical conductors 12 extending through an outer insulative cable jacket 13. Conductors 12, which are of conventional construction, each being formed of copper and having plastic insulation thereover, are shown schematically. A portion of cable jacket 13 is typically removed to create an exposed area 14, which permits access to conductors 12 for repairs, maintenance, or to splice additional conductors thereto in a manner which is well-known in the art. The exposed area 14 is created by cutting away a portion of jacket 13. The exposed area 14 and the repairs or splices made thereat is typically referred to as a cable splice or cable splice location, and these terms may be used interchangeably to describe the exposed area 14 of cable 10. After effecting repairs or splices to the cable, the cable splice 14 must be covered for protective purposes. The description which follows sets forth the preferred method and apparatus of the present invention for sealably covering cable splice 14.

Figure 2:
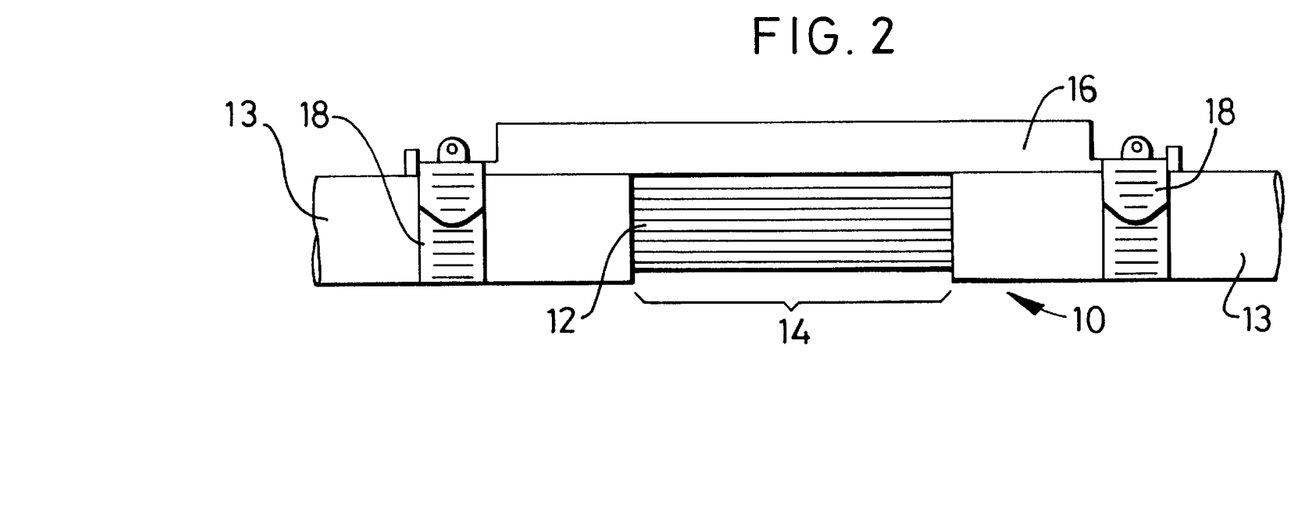
FIG. 2 is a side elevational view of the electrical cable of FIG. 1, showing a stabilizing bar being positioned across the cable splice.

Referring now to FIG. 2, the present invention employs a stabilizer bar 16, which is constructed of length sufficient to span splice 14. Stabilizer bar 16 is formed of a sufficiently rigid material such as metal, and is anchored to the cable jacket 13 on either side of splice 14. Compression clamps 18 or other compressive fastening members may be used to secure stabilizer bar 16 to jacket 13 of cable 10. Stabilizer bar 16 provides structural stability to splice 14, preventing sharp bending thereat which could adversely affect the connections or repairs made to splice 14. Also in certain situations, stabilizer bar 14 may also 'function as a ground strap assuring electrical ground continuity across splice 14. At a stage either prior to or after installation of stabilizer bar 16, repairs, maintenance or splices may be made to conductors 12 at splice 14. These repairs or splices may be accomplished in a manner well known in the art.

Figure 3:
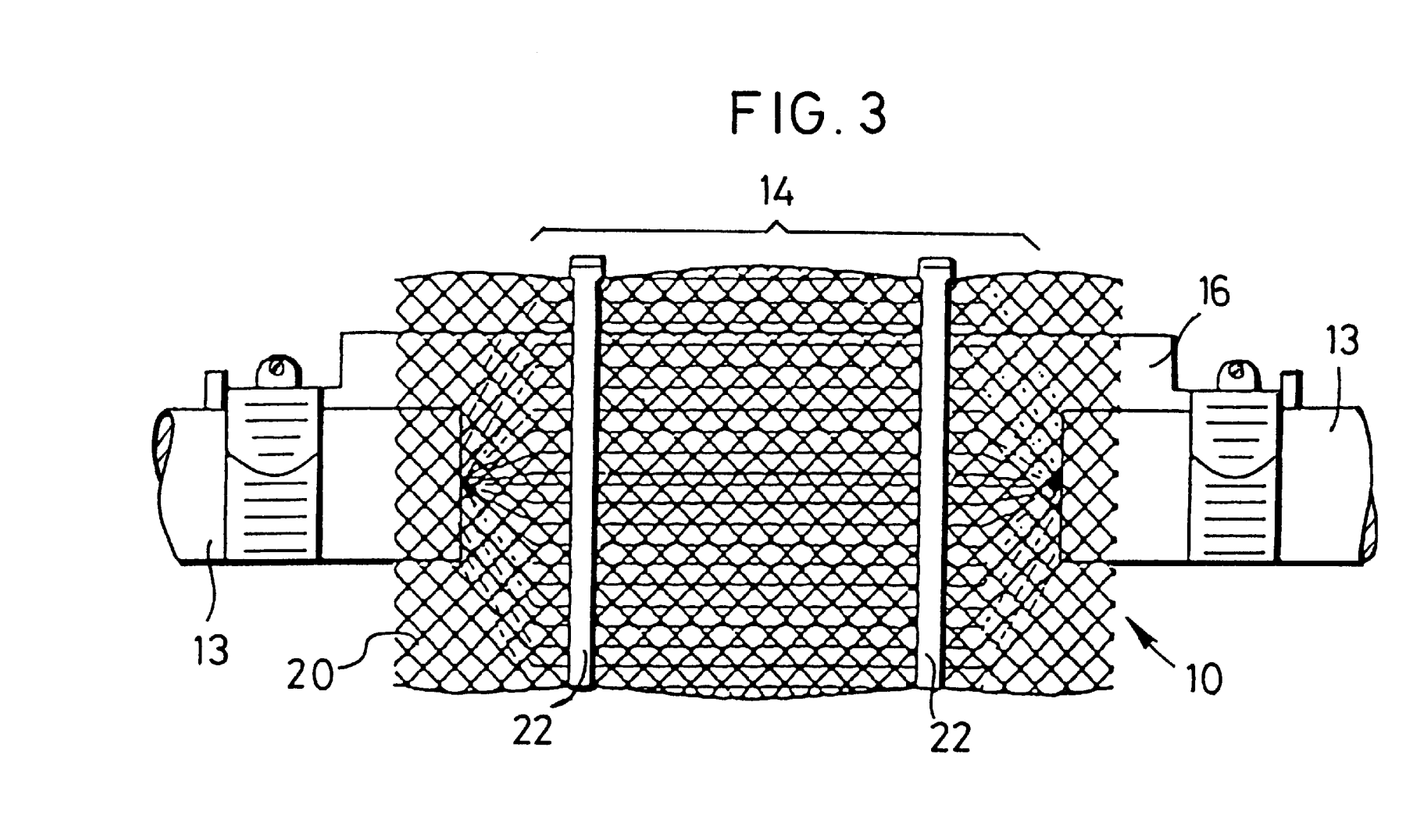
FIG. 3 shows the cable of FIG. 2 with a spacer web positioned about the cable splice.

Referring to FIG. 3, splice 14 is covered with a spacer web 20. Web 20 is generally a mesh-like member which is wrapped around splice 14 and secured thereto using cable ties 22 or other fastening members. As will be described in further detail hereinbelow, spacer web 20 permits the effective encapsulation of splice 14 with a curable encapsulant. Spacer web 20 is of the type which is shown and described in commonly assigned U.S. Pat. No. 4,685,981 issued on Aug. 11, 1987, entitled "Method and Apparatus for Providing a Spacer to a Cable Splice". The spacer web provides separation between the splice area and the internal surface of the enclosure shell thereby allowing encapsulant to fill this area.

Figure 4:
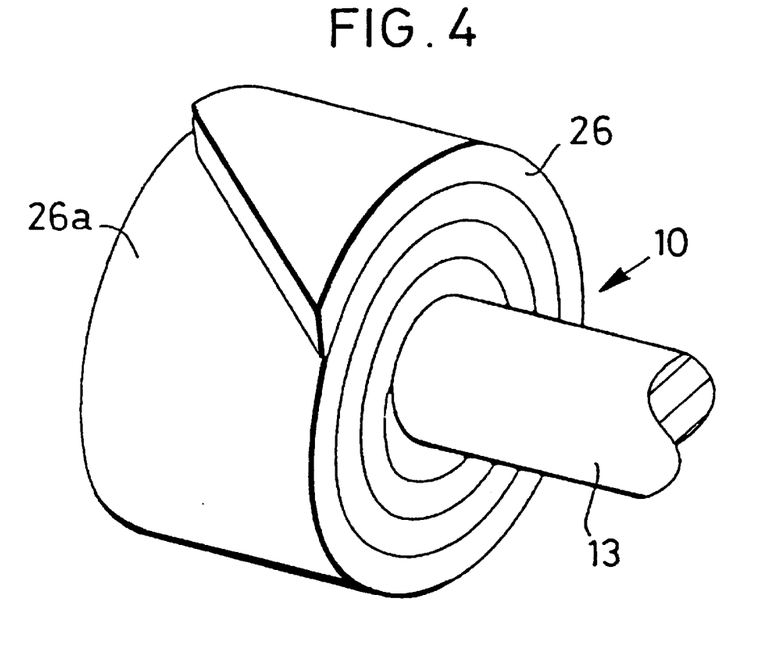
FIG. 4 shows a portion of the electrical cable of FIG. 1 adjacent one side of the splice, with a foam end seal being placed therearound.
Figure 5:
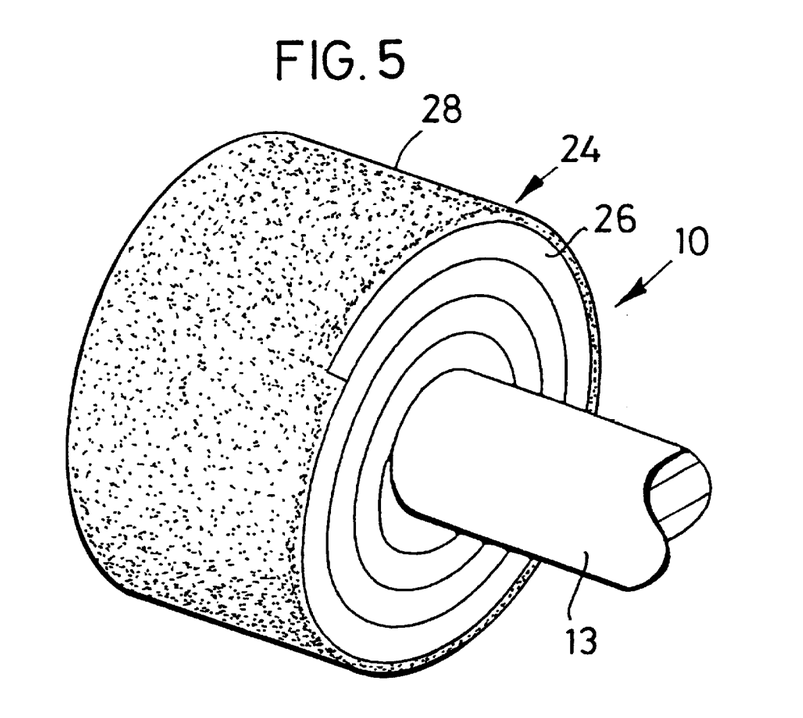
FIG. 5 shows the cable portion of FIG. 4 with a mastic tape placed about the foam end seal.

Referring now to FIGS. 4 and 5, construction of end seals or sealing dams 24 (FIG. 5) may be described. As sealing dams 24 are formed about cable jacket 13 on each side of splice 14 in an identical manner, only formation of one sealing dam 24 will be described with reference to FIGS. 4 and 5. Sealing dam 24 is initially constructed by employing a closed cell foam 26 which may be provided in roll form. Foam 26 is generally a compressible, closed cellular structure. Foam 26 may include adhesive backing on one or both longitudinal planar surfaces 26a, so as to permit the foam to be adhesively wrapped about cable jacket 13. The adhesive surfaces 26a, which may be exposed by removal of release liners (not shown), permit the foam 26 to be adhesively secured to the cable as well as to itself when wrapped therearound. In preferred construction, the foam is wrapped about the cable jacket 13 until the built up diameter of the wraps of foam is larger than the diameter of the splice 14.

Referring to FIG. 5, after the foam 26 is properly positioned about cable jacket 13, a wrapping of mastic tape 28 may be placed thereover. Mastic tape 28 is formed of a tacky, generally compressible mastic which may be supplied in a tape-like rolled form. The mastic tape 28 is wrapped about the foam 26 to further increase the circumference of the sealing dam 24. As shown in FIG. 5, a combination of a foam wrap and a mastic wrap forms sealing dam 24. While this combination is shown as the preferred construction, it is contemplated that other constructions may also be formed. Constructions such as successive alternating wraps of tape and foam may be employed. The present invention further contemplates the use of foam 26 or mastic tape 28 alone to form sealing dam 24. However, as will be described in further detail hereinbelow, it has been found that the combination of a first layer of foam 26 with a wrapping of mastic tape 28 thereover provides effective end sealing, as well as structural integrity.

Figure 6:
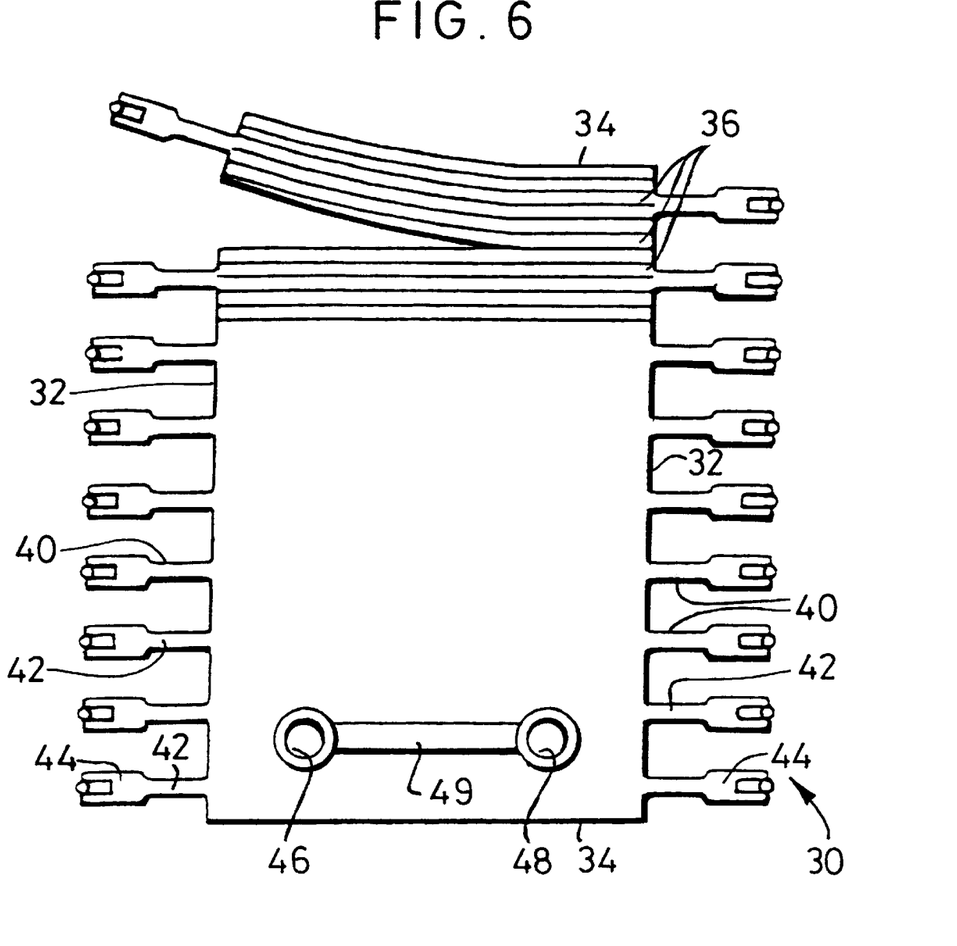
FIG. 6 shows the splice enclosure shell of the present invention used to cover the cable splice shown in FIG. 3.

Referring now to FIG. 6, cable enclosure shell 30 of the present invention is shown. Shell 30 is an elongate flexible planar sheet of plastic material. Shell 30 is generally rectangular, having opposed longitudinal edges 32 and opposed transverse edges 34. The distance between longitudinal edges 32 is constructed so that shell 30 spans cable splice 14 (FIG. 3). In use, shell 30 is wrapped in a cylindrical manner with opposed transverse edges 34 overlapping to form an elongate split unitary cylindrical structure (FIG. 7) having opposed open ends 32a defined by rolled longitudinal edges 32.

Other constructions of shell 30 are also within the contemplation of the present invention. Hard shells having upper and lower shell halves such as those shown in the above identified '133 and '373 may also be employed. However, the flexible shell 30 shown herein has particular utility as it permits use on cable splices 14 of various diameters.

As the diameter of splice 14 may vary depending upon the amount of repairs or interconnections conducted thereat, the length of the planar sheet forming shell 30 may be varied. Shell 30 includes a plurality of longitudinally spaced transversely extending ridges 36, along which shell 30 may be scored and cut or torn to vary the length of the shell. An appropriate cutting tool (not shown) may be used to cut or tear the shell 30 along one of score lines 36.

For purposes which will be described in further detail hereinbelow, shell 30 includes a plurality of spaced fingers 40. Fingers 40 extend outwardly from longitudinal edges 32. In the preferred embodiment, fingers 40 are integrally formed with shell 30. Also as shown, each finger 40 includes a narrow proximal portion 42 immediately extending from longitudinal edge 32 and a wider distal portion 44, spaced from longitudinal edge 32.

Shell 30 further includes an inlet port 46 and a transversely spaced outlet port 48 therethrough. Ports 46 and 48 may be formed integrally with the formation of shell 30 or may be placed in shell 30 after formation thereof. In the present illustrative embodiment, an integrally formed structural reinforcing member 49 spans the space between ports 46 and 48. The reinforcing member 49 has a secondary function of providing a clear channel for air to travel to the outlet port 48 during the filling operation. The use of ports 46 and 48 will be described in further detail hereinbelow.

Figure 7:
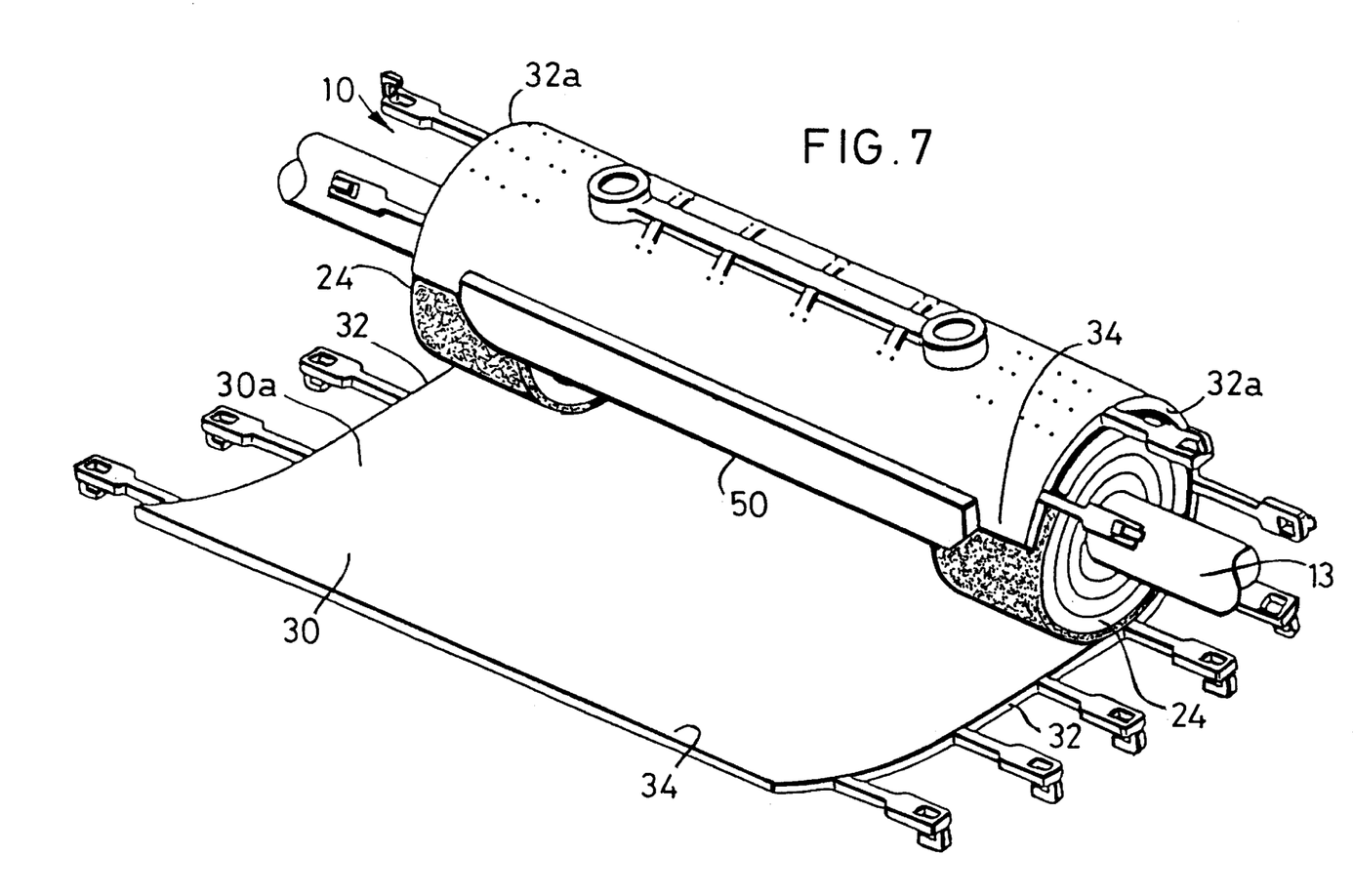
FIG. 7 shows the splice enclosure shell of FIG. 6 partially wrapped about the cable splice.

Referring more specifically to FIG. 7, shell 30 may be wrapped around cable splice 14. After shell 30 is cut to the desired length, the shell 30 is positioned about splice 14 with one planar surface 30a positioned in contact with sealing dams 24. The shell is positioned so that sealing dams 24 are adjacent longitudinal edges 32 of shell 30. In this manner, when shell 30 is formed into a cylindrical structure, sealing dams 24 close open ends 32a thereof. Shell 30 is positioned so that opposed transverse edges 34 overlap. A strip of gasketing material 50 may be interposed between the overlapped edges 34. Any suitable gasketing material may be employed. In fact, it is contemplated that either or both of strips of foam 26 or mastic tape 28 may be employed as a sealing gasket. When properly overlapped, shell 30 forms a unitary cylindrical enclosure 52 about splice 14 (FIG. 8) with sealing dams 24 closing opposed open ends 32a thereof.

In order to retain shell 30 in a closed cylindrical construction, a plurality of radially compressive retaining straps 54 may be positioned therearound. One or more of the straps 54a is positioned directly over each of sealing dam 24. In this manner, tight compressive engagement is maintained between shell 30 and sealing dam 24 adjacent open end 32a.

The present construction of sealing dams 24, as above described, formed with a combination of closed cell foam 26 and mastic tape 28, provides a superior seal at open ends 32a of shell 30.

Figure 8:
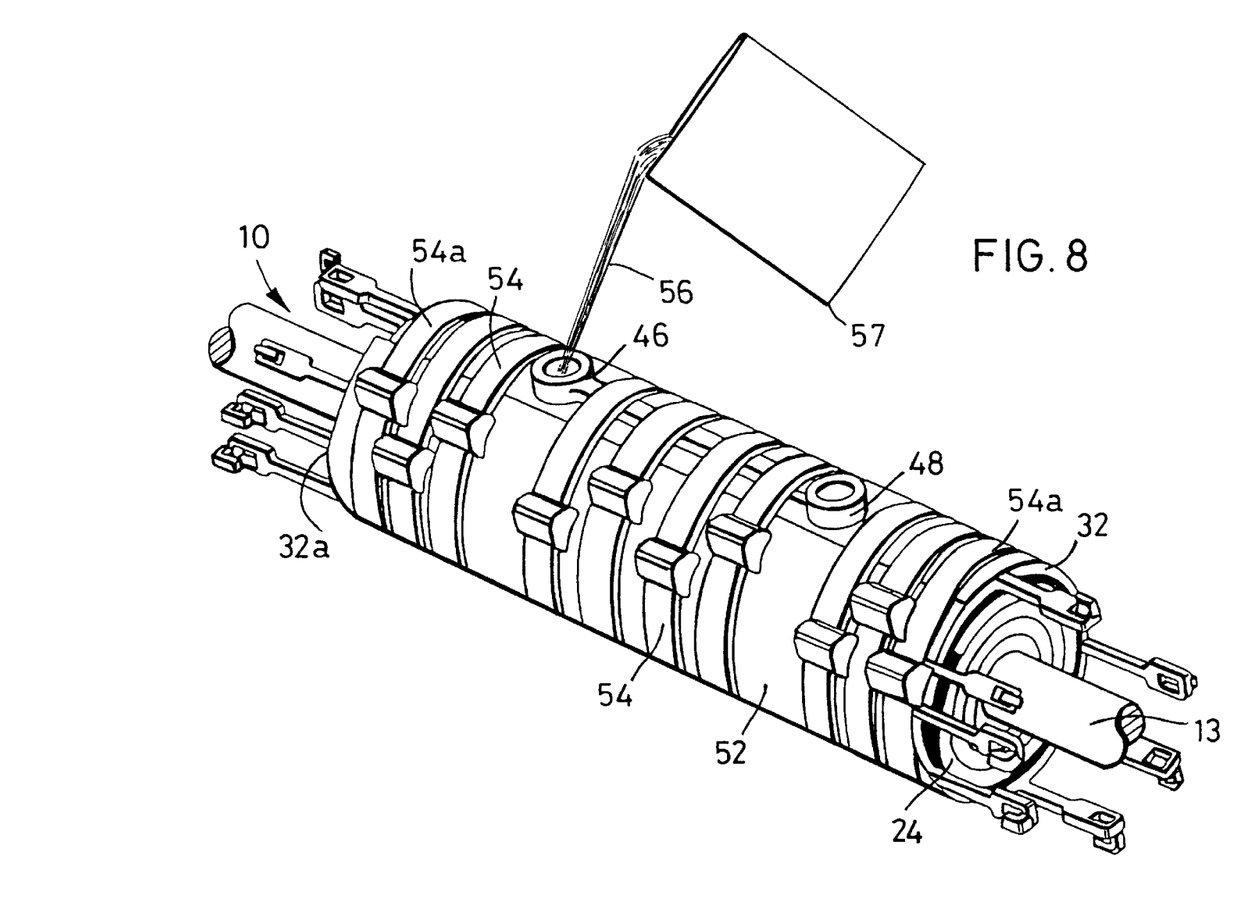
FIG. 8 shows the splice enclosure shell of FIG. 6 positioned about the cable splice with encapsulant being poured thereinto.

Having constructed enclosure 52 about splice 14, effective sealing of the splice 14 may be achieved by introducing an encapsulant 56 into enclosure 52. In order to effectively seal splice 14 and to ensure that the encapsulant seals between the interstitial spaces of the individual insulated conductors 12, the encapsulant 56 may be injected into enclosure 52 under pressure. A method and apparatus for encapsulating a cable splice under pressure is shown and described in above-mentioned U.S. Pat. No. 5,245,133 issued Sep. 14, 1993, entitled "Moisture Resistant Cable Splice and Sealing Structure Thereof" and U.S. Pat. No. 5,251,373 issued Oct. 12, 1993, entitled "Method for Protection of Cable Splice". These patents are incorporated herein by reference.

In the preferred embodiment shown herein, encapsulant 56 is poured into enclosure 52 from a suitable container 57 through inlet port 46. The encapsulant may be applied under pressure or may be subsequently pressurized. Spacer web 20 (FIG. 3) permits encapsulant to flow completely around splice 14. Outlet port 48 serves to permit the escape of air to allow enclosure 52 to be filled with encapsulant 56. Outlet port may also serve to permit escape of some encapsulant providing indication that the enclosure is filled. Alternatively, a check valve 62 and a pressure relief valve 64 (see FIG. 10) may be interposed in ports 46 and 48, respectively, in a manner taught in the above-referenced '133 and '373 patents. As the encapsulant 56 is forced into enclosure 52 under pressure, there is a tendency for the encapsulant to exert outward pressure on sealing dams 24 closing open ends 32a of shell 30. Such outward pressure may be sufficient to cause migration of the sealing dams 24 out from the open ends 32a of shell 30. In order to prevent such outward migration, sealing dams 24 are retained by extending fingers 40.

Figure 9:
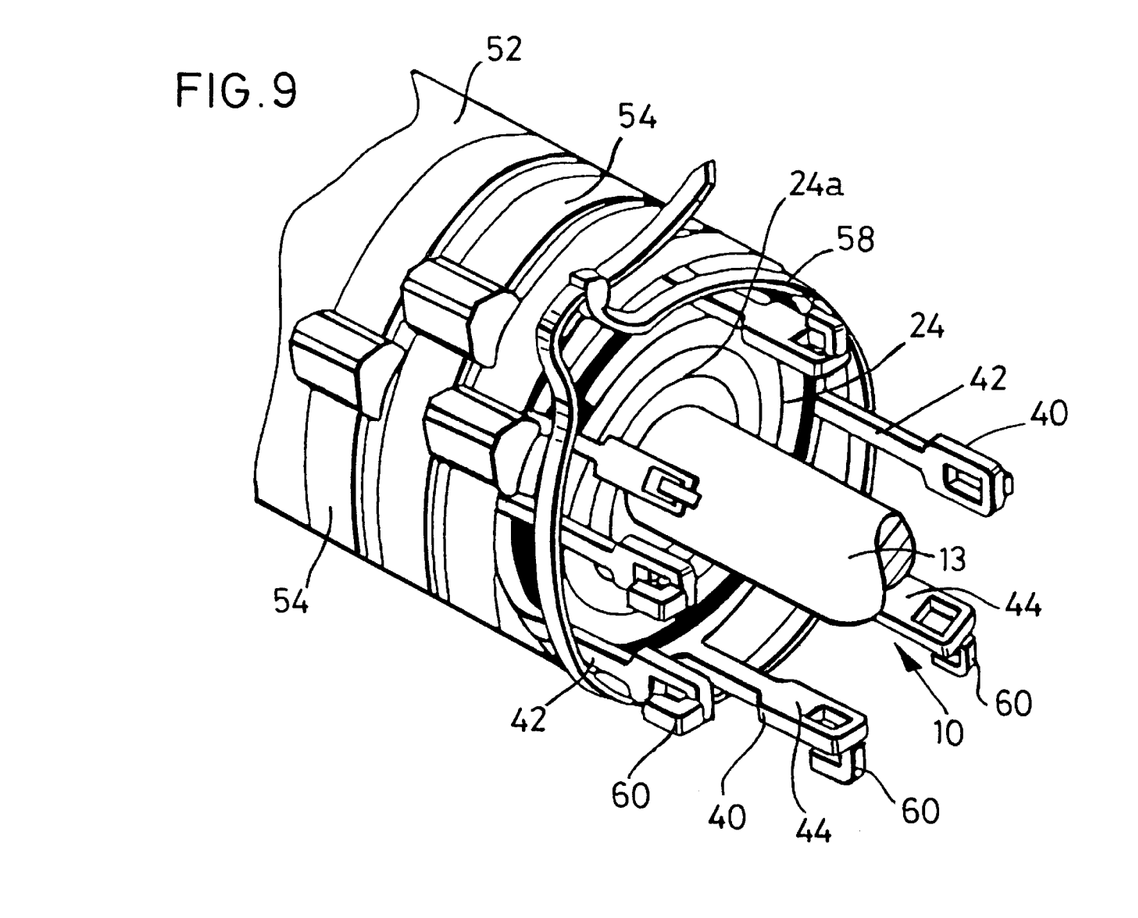
FIG. 9 shows a portion of the splice enclosure of FIG. 8, with extending shell fingers adapted to be connected to each other.

Referring to FIG. 9, a cable tie 58 or other radially-compressive fastening member is looped around cable jacket 13 and extending fingers 40 which extend circumferentially about jacket 13. The cable tie 58 is tightened so that the tie comes in contact with distal portions 44 of fingers 40. Each of distal portions 44 includes an outwardly extending retaining element 60, which is preferably in the shape of a reverse hook. While hook-shaped retaining elements 60 are shown as the preferred technique for supporting and retaining cable tie 58, other techniques may also be employed. The cable tie 58 may be threaded or snapped into the hook-shaped retaining elements 60.

Figure 10:
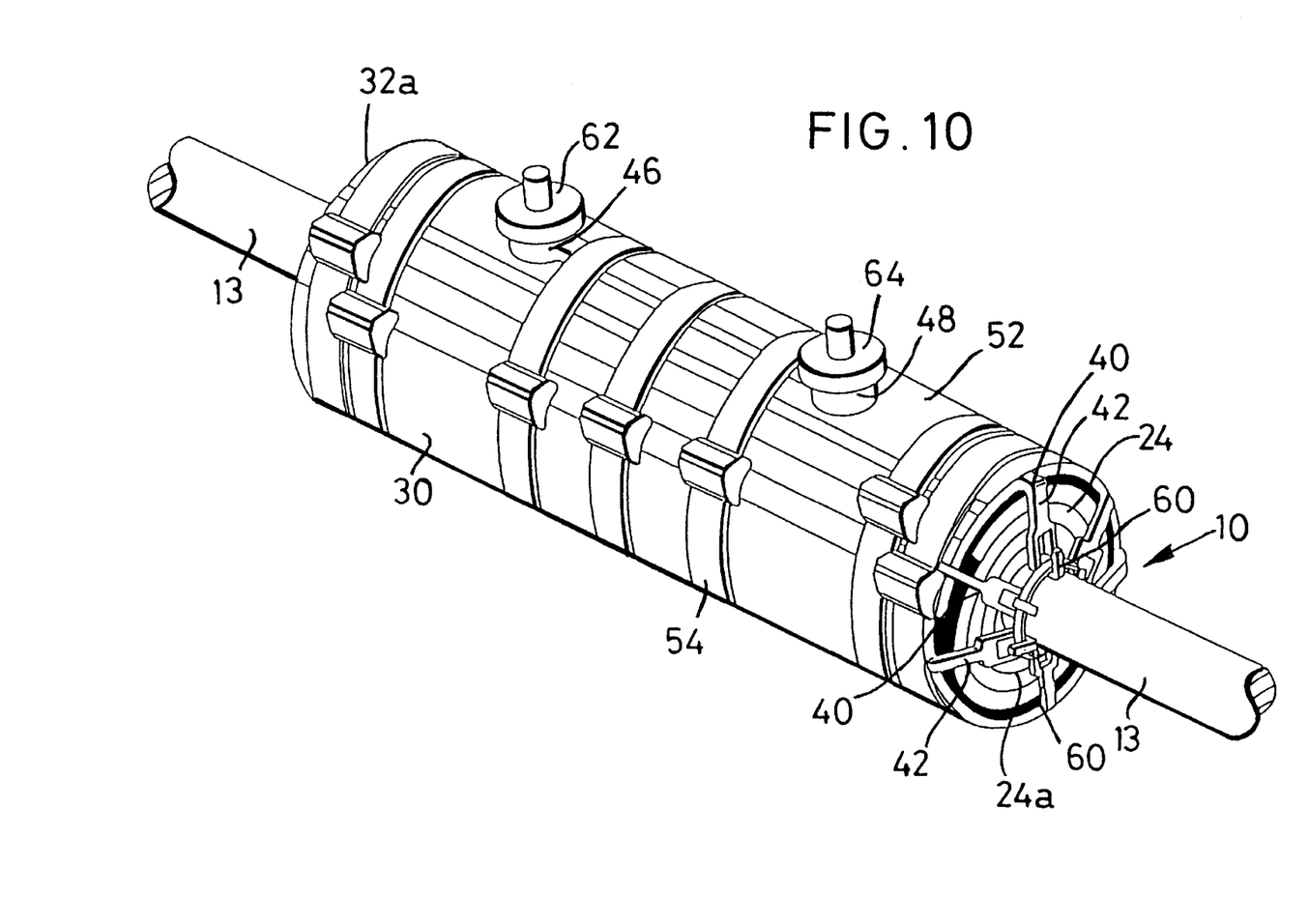
FIG. 10 shows the completed splice enclosure of the present invention.

As seen in FIG. 10, the cable tie 58 is then tightened, preferably by hand, about cable jacket 13. In this manner, the proximal portions 42 of fingers 40 are positioned along an exterior annular surface 24a of sealing dams 24. The cable tie 58 being retained by retaining elements 60, secures the fingers 40 to each other outwardly adjacent sealing dam 24 preventing movement thereof. In the preferred embodiment the retaining elements 60 in the secured positions do not contact the cable jacket 13, but lie in position spaced above the jacket 13 forming a diameter substantially less than the outer diameter of the sealing dams 24. However, the retaining elements 60 may also lie on the cable jacket 13 within the scope of the invention. Such securement prevents outward migration of sealing dam 24 upon the forced encapsulation of splice 14.

As described in the above referenced incorporated patents, the encapsulant 56 cures to a gel-like consistency, establishing a moisture barrier in a relatively short period of time (about one hour). Therefore, it is only necessary for the fingers 40 to positionally confine sealing dams 24 until such time as the encapsulant cures and no further pressure is exerted upon sealing dams 24.

Figure 11:
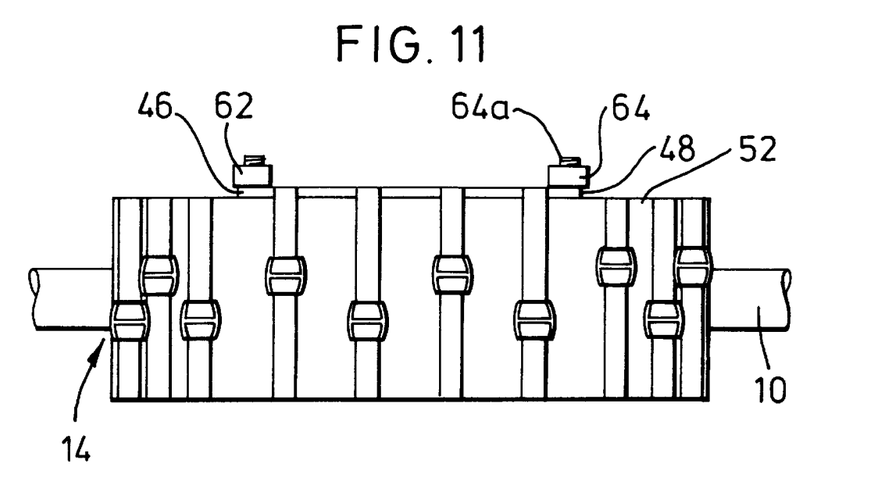
FIG. 11 is a plan view of the splice enclosure of the present invention including an inlet check valve and an outlet pressure relief valve.
Figure 12:
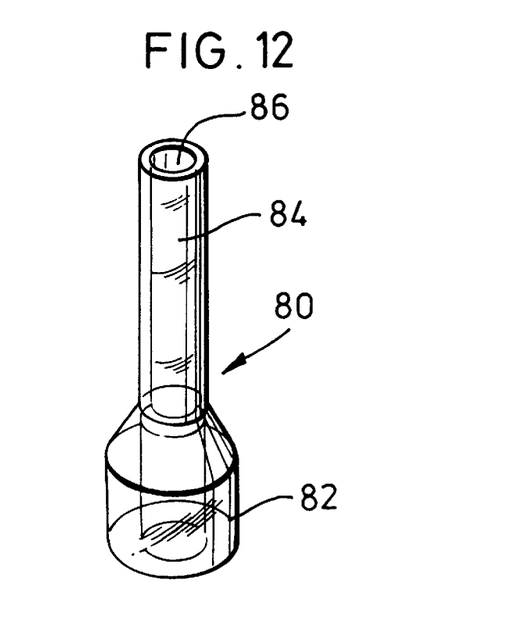
FIG. 12 is a perspective showing of an encapsulant container for positioning over the pressure relief valve shown in FIG. 11.
Figure 13:
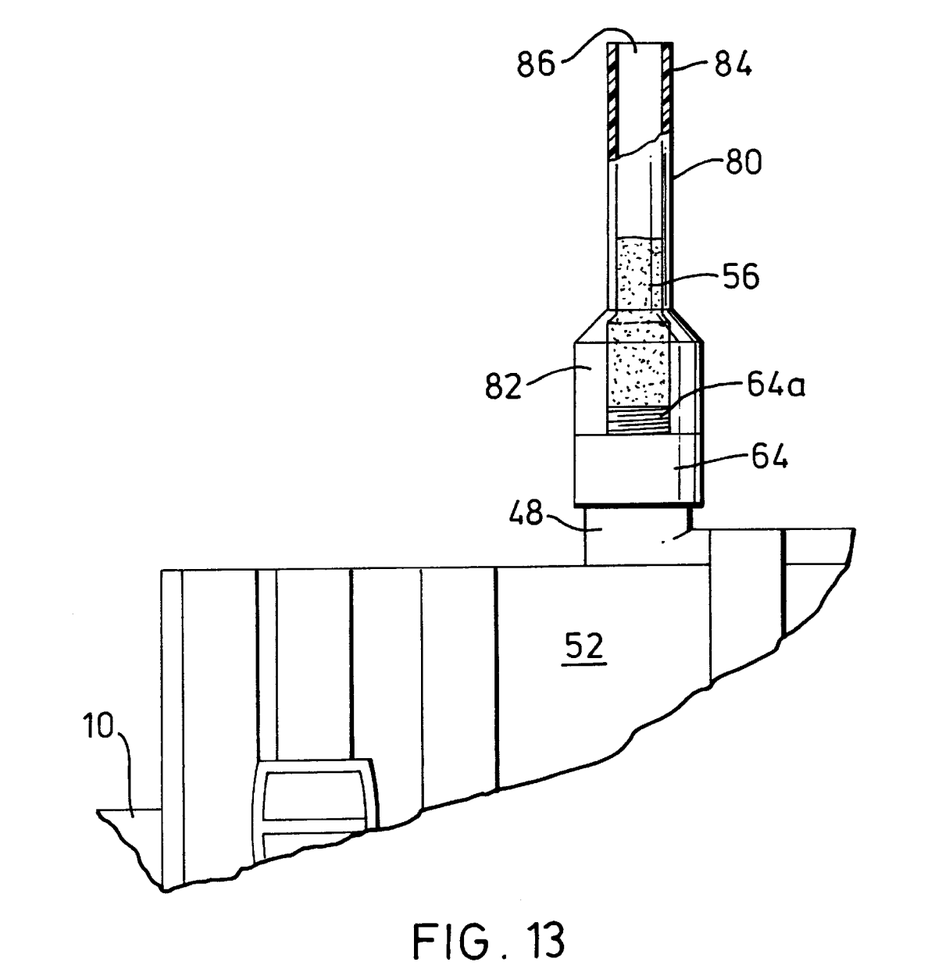
FIG. 13 shows the container of FIG. 12 attached to the pressure relief valve of FIG. 11.

A further feature of the present invention is shown in FIGS. 11–13. In order to facilitate the pressurized encapsulation of splice 14 contained within enclosure 52, the enclosure employs a check valve 62 over inlet port 46 and a pressure relief valve 64 over outlet port 48. The use of a check valve and a pressure relief valve to provide for the pressurized filling of enclosure 52 with curable encapsulant 56 is more fully described in the above-referenced '133 and '373 patents which are incorporated by reference. Pressure relief valve 64 may be any conventional pressure relief valve which may be preset by the manufacturer to open at a preselected pressure. In the present invention, it has been determined that a pressure of approximately 8 psi is sufficient to provide desired sealing effect. Check valve 62 may be a conventional check valve that allows fluid entry but closes to prevent backflow of fluid or air out through the valve. It is desirable to orient pressure relief valve 64 at a level higher than check valve 62 to assure that the encapsulant fills enclosure 52. Encapsulant may be pumped or otherwise forced into inlet port 46 through check valve 62 under pressure. Air, trapped within enclosure 52 is pressurized. When the pressure within the enclosure reaches 8 psi (or other preset pressure) pressure relief valve 64 opens up thereby allowing air to escape as encapsulant continues to be pumped through check valve 62. After air has been released through pressure relief valve 64, encapsulant will escape through pressure relief valve 64. Encapsulant is continually pumped into enclosure 52 until a steady stream of encapsulant flows through pressure relief valve 64 indicating that the enclosure has been filled with encapsulant and that all air has been forced out of enclosure 52. This provides an indication that the enclosure is filled and that pumping of encapsulant may be stopped.

As may be appreciated, in order to assure that all air is forced out of enclosure 52 and that the enclosure is completely filled with encapsulant, the craftsperson must await the exiting flow of encapsulant through pressure relief valve 64. Air trapped in the splice needs time to escape due to the high viscosity of the encapsulant. The present invention attempts to retain the escaping uncured encapsulant 56 while still providing a visual indication that the enclosure 52 is filled with encapsulant and air has been forced out of the enclosure.

FIG. 12 shows a container 80 which may be placed over pressure relief valve 64 to retain exiting encapsulant caused by the pressurized encapsulation of the splice 14 within enclosure 52. Container 80 is an elongate, generally tubular member, preferably of uniform diameter including opposed open ends 82 and 84. However, lower end 82 may be larger than opposed upper end 84 to facilitate attachment of container 80 to pressure relief valve 64 as will be described in further detail hereinbelow.

Container 80 defines a central longitudinal bore 86 between opposed ends 82 and 84 through which encapsulant 56 may pass. The lower end 82 may include cooperative attachment means for securing container 80 to pressure relief valve 64. It is contemplated that the lower end 82 of container 80 may be internally screw-threaded to match the external screw threads of the extending portion 64a of relief valve 64. However, any other retaining structure such as, for example, a cable tie, may be employed to secure the lower end 82 of container 80 to pressure relief valve 64.

Referring specifically to FIG. 13, chamber 80 is shown attached to pressure relief valve 64. Bore 86 forms a chamber which is in communication with an opening (not shown) in the upper portion 64a of pressure relief valve 64. During the initial stages of the encapsulation of enclosure 52, air which is forced through pressure relief valve 64 is passed through bore 86 and out of open end 84 of container 80. As enclosure 52 is further filled with encapsulant 56 to the point where encapsulant exits or exudes from pressure relief valve 64, container 80 accommodates such exiting encapsulant within bore 86. Container 80 is constructed to have sufficient size to accommodate a given volume of exiting encapsulant sufficient to assure that all air has been purged from enclosure 52 during encapsulation. In order to provide a visual indication that air has been purged from enclosure 52 and that encapsulant is now exiting pressure relief valve 64, container 80 is formed of a light transmissive material such as clear polyvinylchloride. The material forming container 80 may be either translucent or transparent but would be, sufficiently light-transmissive so that encapsulant within container 80 can be observed from outside thereof. Thus, upon filling enclosure 52 with encapsulant, the exiting encapsulant is retained within container 80 while still providing a visual indication that the enclosure 52 has been purged of air and filled with encapsulant. In this manner, there is no need to clean up or discard uncured encapsulant as the uncured encapsulant is retained within container 80. At such time as the encapsulant cures, the container 80 may be removed and discarded as cured encapsulant does not pose the clean up problems presented by the uncured product. It is further contemplated that after curing, the container 80 may be left in place over the pressure relief valve and the enclosure may be buried underground or left suspended overhead with the container in place.

Various changes to the foregoing described and shown structures would now be evident to those skilled in the art. Accordingly, the particularly disclosed scope of the invention is set forth in the following claims.

We claim:

1. An electrical cable splice enclosure comprising:

an enclosure shell for enclosing an electrical cable splice and for accommodating a curable encapsulant therein;

said shell including an inlet port for pressurized insertion of said encapsulant and an outlet port for permitting exiting of said encapsulant therefrom upon filling of said enclosure;

a pressure relief valve positioned over said outlet port; and an outlet container positioned over said pressure relief valve for containing said exiting encapsulant, said container being formed of a light transmissive material enabling said exiting encapsulant to be observed, said container including an elongate hollow tube having opposed open ends.

2. An electrical cable splice enclosure of claim 1 wherein one end of said tube includes means for attaching said tube to said outlet port.

3. An electrical cable splice enclosure of claim 1 wherein said container is formed of translucent material.

4. An electrical cable splice enclosure of claim 1 wherein said container is formed of transparent material.

5. An electrical cable splice enclosure of claim 1 wherein said elongate hollow tube is constructed to have sufficient size to accommodate a given volume of exiting encapsulant.

6. A method for encapsulating a cable splice comprising the steps of:

positioning an enclosure shell about a cable splice, said shell having an inlet port and an outlet port, said shell further having a pressure relief valve positioned over said outlet port;

placing a container having means to observe the interior thereof over said pressure relief valve, said container including an elongate hollow tube having opposed open ends; and injecting an encapsulant into said shell through said inlet port until such time as encapsulant is visually observed to exude from said outlet port into said container.

7. A method of claim 6 wherein said container is formed of light transmissive material.

* * * * *